United States Patent [19]

Oudet

[11] Patent Number: 4,908,592

[45] Date of Patent: Mar. 13, 1990

[54] ELECTROMAGNETIC ACTUATING DEVICE

[75] Inventor: Claude Oudet, Besancon, France

[73] Assignee: Portescap, La Chaux-de-Fonds, Switzerland

[21] Appl. No.: 162,333

[22] PCT Filed: Jun. 1, 1987

[86] PCT No.: PCT/CH87/00063

§ 371 Date: Feb. 1, 1988

§ 102(e) Date: Feb. 1, 1988

[87] PCT Pub. No.: WO87/07757

PCT Pub. Date: Dec. 17, 1987

[30] Foreign Application Priority Data

Jun. 2, 1986 [CH] Switzerland ............................ 228/86

[51] Int. Cl.[4] .............................................. H01F 7/08
[52] U.S. Cl. ...................................... 335/229; 335/230
[58] Field of Search ............... 335/229, 230, 234, 267, 335/279

[56] References Cited

U.S. PATENT DOCUMENTS 4,195,277  3/1980  Leicht ................................. 335/229
4,349,757  9/1982  Bhate .................................... 310/15
4,389,131  6/1983  Kondo ............................ 335/266 X
4,456,934  6/1984  Wedman et al. ..................... 335/234
4,527,139  7/1985  Bohg et al. ........................... 335/256
4,703,297 10/1987  Nagasaka ........................ 335/229 X

FOREIGN PATENT DOCUMENTS 0127692 12/1984  European Pat. Off. .

Primary Examiner—George Harris
Attorney, Agent, or Firm—Cushman, Darby & Cushman

[57] ABSTRACT

An actuation device having a moving member with a part magnetized perpendicularly to its displacement direction and two magnetic circuits having each, an air gap in which is arranged a portion of the magnetized part. Each magnetic circuit also has at least one electric energization coil coupled with it. The moving member is so arranged as to allow the magnetized part to effect a limited motion in both directions while the magnetic fluxes generated by the magnetized part are closed in the magnetic circuit outside the air gaps. The device provides a constant force on the limited path and has virtually no residual torque.

10 Claims, 3 Drawing Sheets

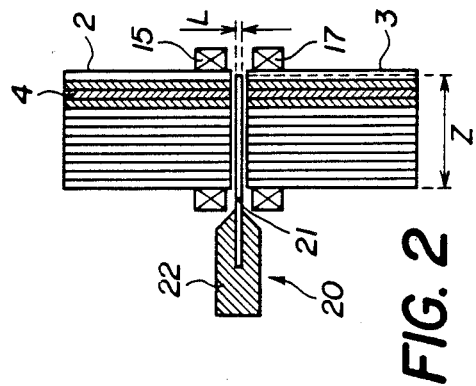
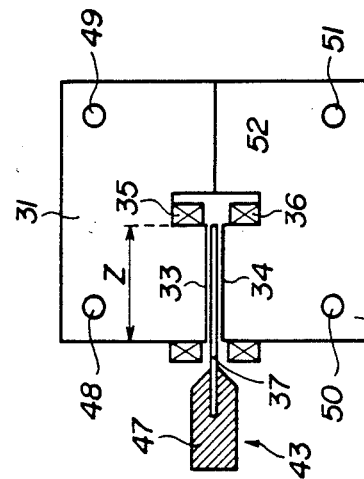
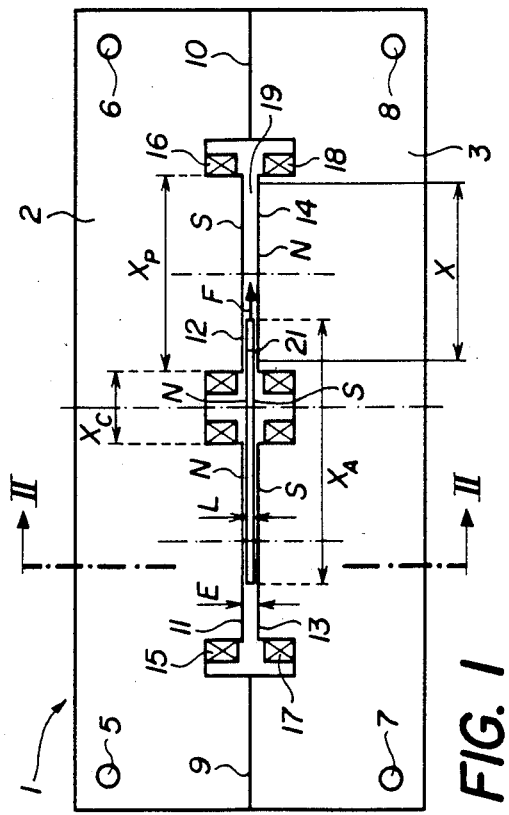
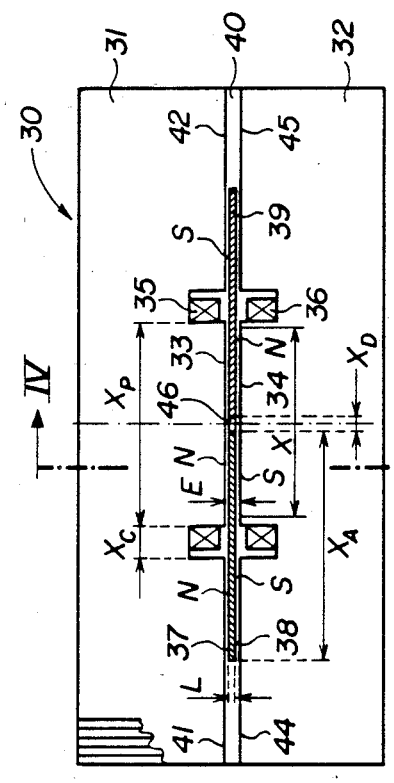

ELECTROMAGNETIC ACTUATING DEVICE

BACKGROUND OF THE INVENTION

1. Field of the Invention

The present invention relates to an electromagnetic actuating device comprising a movable member and a stator structure. The movable member comprises at least one portion magnetized perpendicularly to the direction of its movement and having a small thickness with respect to its other while, the stator structure comprises at least one magnetic circuit made of a material of very high magnetic permeability, an air-gap in which at least one portion of the magnetized part is arranged, and at least one electric energizing coil coupled with the magnetic circuit.

2. Description of the Prior Art

Devices of this general type are used in rotatory motors with rapid speed variations in which it is generally desired to accomplish a great number of elementary movements or steps per revolution of the rotor. These devices, however, do not provide a constant force over a relatively long distance and they are not entirely free of residual torque, i.e., torque in the absence of current. Furthermore, they are generally relatively complex, be it in single phase or two-phase design.

SUMMARY OF THE INVENTION

The invention aims in particular at providing a simple and economic actuating device for effecting movement of the movable member over a limited distance with a substantially constant force and having practically no residual torque. Such a device can be used, for example, for actuating the supporting arm of the reading and writing head of a rotatory disc memory, such as a hard or floppy disc, of a magnetic or optical disc. For such applications, one often uses devices with a movable coil in a stator structure with a permanent magnet, called "voice coil" devices. These devices require a relatively large magnet which leads to a relatively high cost. It further has, in particular, a volume and an inertia which are not of a minimum value with respect to the force produced.

The invention has also for its object to remedy the inconvenience of these known devices. To this effect, the device according to the invention is arranged so that the magnetized part can effect a limited movement inside the air-gap under the action of a constant force which is proportional to the current flowing in the energizing coil or coils and is practically free from residual torque in the absence of energizing current. Preferred embodiments of the invention for providing such benefits are described in claims 1 to 8.

BRIEF DESCRIPTION OF THE DRAWING

The features, the advantages and the possibilities of application of the invention will become more clearly apparent from the description given hereunder of various non-limiting examples of embodiments thereof which are illustrated in the attached drawing in which:

FIG. 1 is a view of a linear actuating device according to the invention,

FIG. 2 is a view in section along line II—II of FIG. 1,

FIG. 3 is a view of an alternative embodiment of the linear actuation device of FIG. 1, FIG. 4 is a section along line IV—IV of FIG. 3.

DETAILED DESCRIPTION OF THE PREFERRED EMBODIMENTS

Figure 5:
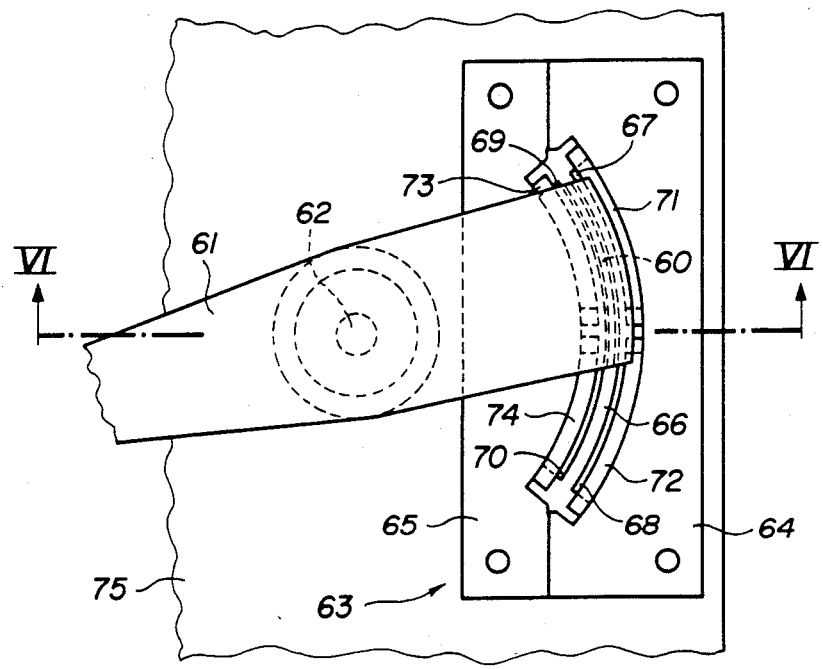
FIG. 5 is a view of an actuating device with a rotating arm according to the invention.

The linear actuating device shown in FIGS. 1 and 2 comprises a longitudinal stator structure 1 having an air-gap 19 between two stator parts 2,3, each formed by a stack of sheets of a material of very high magnetic permeability, for example, of iron-nickel 50/50. The sheets such as a sheet 4 referenced in FIG. 2 extend in the longitudinal direction and are assembled by fixing members (not shown), extending, for example, through assembling holes 5,6,7,8. The lamellar configuration of the parts thus formed allows the losses by eddy currents in the stator structure to be reduced. The ends of these stator parts are arranged to form magnetic joints 9,10 assuring the closing of the magnetic circuits outside the air-gap.

Each of the stator parts 2,3 has two polar parts designated respectively by 11,12 and 13,14, these polar parts being surrounded by respective electric energizing coils 15,16,17,18, the windings of which, as shown in FIG. 1, are received in slots of the stator parts. The polar parts of a same stator part with the respective coils are arranged side by side in the longitudinal direction of the stator structure, and the polar parts belonging to different stator parts are arranged in opposite relationship at a constant distance E.

A movable member 20 comprises a thin and flat magnetized part 21 as well as a supporting part 22 in which the magnetized part is imbedded as shown in FIG. 2. The supporting part 22 is movably mounted with respect to the stator structure by means not represented, so as to allow a linear longitudinal movement of the magnetized part 21 inside the air-gap 19.

Part 21 is magnetized, uniformly in the direction of its thickness, i.e., perpendicularly to its larger surfaces, so as to exhibit on one large surface a magnetic pole N and on the other, opposite surface a pole S. The material of which part 21 is made is, for example, samarium-cobalt $SmCo_5$ and thus has a demagnetization characteristic which is practically linear in the whole working range in which the present device is used and has a reversible permeability near that of the air. The thickness L of the magnetized part is substantially smaller than the other dimensions of that part.

Coils 15 and 17 are arranged for being fed by currents in such a way that they generate a magnetic field in a first direction in the air-gap between polar parts 11,13 which, for example, exhibit at their respective surfaces magnetic poles N and S. Coils 16,18 are arranged, on the other hand, so as to produce between the corresponding polar parts 12 and 14 a magnetic field in the opposite direction to that of parts 11 and 13, i.e., that the polar part 12 has in this example a pole S and the part 14 a pole N. It is to be noted that the different coils surround the corresponding polar parts close to the air-gap so as to reduce the leakage of magnetic flux outside of the air-gap and to obtain an optimum efficiency.

In the present device, the path of movement of the magnetized part inside the air-gap 19 is limited to a length X, more precisely to lengths of X/2 in the two directions from a position of symmetry. The length of each of the polar parts, also measured in the direction of movement of the magnetized part, is designated by $X_P$. As a general rule, X must not be longer than $X_P - 0.5$ E. On the other hand, the length of the polar parts ($X_P$) is always chosen greater than 8E, and the length $X_A$ of the magnetized part measured in the same direction, i.e., the direction of its movement, is preferably equal to $X_P + X_C$, $X_C$ designating the length of the slots which separate the polar parts in a same stator part.

Under the conditions of dimensioning as indicated above, when coils 15 to 18 are energized by current so as to each have ni/2 ampere-turns, the magnetized part is submitted to a force F in the direction of movement which is given by the relationship $F = 2 B_r (L/E) Z \cdot ni$, where $B_r$ represents the remanent induction of the magnetized part and Z the width of the portion of the magnetized part located in the air-gap, this width being measured perpendicularly to the direction of movement (FIG. 2). This force F is independent of the position of the magnetized part inside the air-gap and it is proportional to the energizing current i. It is to be noted that for the preferred length of the magnetized part, i.e., $X_A = X_P + X_C$, the length X of the paths of movement over which the force F is constant for a given current reaches a maximum. For smaller or greater lengths $X_A$, the length X is reduced and becomes practically zero when $X_A = X_C + 0.5$ E or $X_A = X_C + 2 X_P - 0.5$ E. Furthermore, since the magnetized part is arranged over the whole length of its movement in a constant total air-gap, it is practically subject to no residual torque at all in the absence of energizing current.

The symmetrical arrangement of the device according to FIGS. 1 and 2 with respect to the plane containing the magnetized part can be replaced by a dissymmetrical arrangement in which the stator part 3, for example, is formed by a simple part for closing the flux without coils 17 and 18.

The embodiment of the device represented in FIGS. 3 and 4 is an alternative arrangement of the linear actuating device of FIGS. 1 and 2. It comprises a longitudinal stator structure 30 having an air-gap 40 in which two portions 38,39 of a flat magnetized part 37 of small thickness L are arranged. The magnetized part is a part of a movable member 43 which, as in the case of the preceding example, can comprise a supporting part 47 for the magnetized part and is arranged so as to allow a limited linear movement of the magnetized part inside the air-gap 40. Both portions 38 and 39 of part 37 are magnetized in opposite directions, perpendicularly to the direction of movement, so as to exhibit, for example, magnetic poles N and S respectively on the upper surfaces of the portions 38 and 39 and poles S and N on the respective lower surfaces of these portions. The length of each of these magnetized portions, measured in the direction of movement, is again designated by $X_A$.

In the case where part 37 is formed by a single piece of magnetizable material, the two magnetized portions are separated by a dead transition zone designated by 46 in FIG. 3. The dimension $X_D$ of this zone, measured in the direction of movement, is preferably as small as possible, for example, on the order of magnitude of the thickness L of the magnetized part. The material of the magnetized part has a linear demagnetization characteristic and a reversible permeability close to that of the air, as in the examples of FIGS. 1 and 2.

The stator structure 30 comprises two stator parts 31,32 forming each of three polar parts, namely, in the case of part 31, a first polar part 33 surrounded by an energizing coil 35 and two lateral polar parts 41,42 not surrounded by coils and arranged on either side of the first polar part in the direction of movement of the magnetized part with a spacing of $X_C$. This spacing corresponds to the dimension of the slot lodging coil 35.

Similarly, the stator part 32 has a first polar part 34 surrounded by coil 36 and two lateral polar parts 44,45 not surrounded by coils, the polar parts of the stator part 32 being arranged opposite the corresponding polar parts of the stator part 31 at a constant distance E.

The length of the various polar parts measured in the direction of movement of the magnetized part is designated by $X_P$ and coils 35,36 are energized so as to provide potentials of same polarity at the air-gap. Part 33 corresponds, for example, to a pole N and part 34 to a pole S.

Each of the stator parts is made in lamellar form but, in the present example, the stator structure has a C-shaped cross-section as shown in FIG. 4, and the stator parts thus have the form of a stack of sheets arranged perpendicularly to the direction of movement of the magnetized part. Assembling holes 48,49,50,51 are provided in the longitudinal direction and a magnetic joint is formed, for example, at the location 52 at the level of the air-gap 40. Accordingly, the magnetic circuits of the stator structure are closed perpendicularly to the path of movement of the magnetized part, in other words, over the backside of that structure, while in FIGS. 1 and 2 the closing was provided in planes parallel to the path of movement. It is to be noted that each of these solutions is applicable in principle in either case, the structure of FIGS. 1 and 2 being longer and the structure of FIGS. 3 and 4 being deeper.

The device of FIGS. 3 and 4 could also be replaced by a dissymmetrical arrangement in which one of the stator parts does not comprise any coil and forms a simple part for closing the magnetic circuits.

The movement of the magnetized part 37 is limited to a total length of X which extends symmetrically, i.e. over lengths X/2 with respect to a position in which the separating zone between the magnetized portions 38,39 is in the middle between the lateral edges of the polar parts 33 or 34. As in the preceding example, X must at least be smaller than $X_P - 0.5$ E, and the length of the polar parts $X_P$ is preferably always greater than at least 8 E. It is to be noted that the lateral polar parts 41,42,44,45 could be longer than $X_P$. The length of the magnetized parts $X_A$ must always be substantially greater than $X_P/2$ in order that the length of movement X may have a measurable value, the force applied to the movable member remaining constant over that length of movement, independently of the position of that member. The maximum value of X is reached for $X_A = X_P + X_C$, and the force delivered by the device is $F = 2 B_r (L/E) Z \cdot ni$ as previously with the same notations.

It will be seen that, in the present example, the ampere-turns ni are provided by a single pair of coils 33,34, or a single coil in the case of a dissymmetrical structure, while in the preceding case two pairs of coils each having ni ampere-turns were used. Accordingly, two times less ampere-turns are necessary to obtain the same force, but a total length practically twice that of the magnetized part is required.

Figure 6:
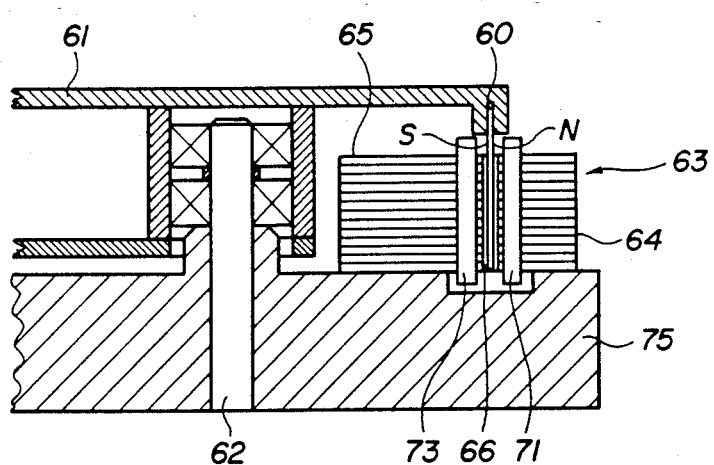
FIG. 6 is a section along line VI—VI of FIG. 5.

FIGS. 5 and 6 show an actuating device with rotatory arm based on the same principle as that of FIGS. 1 and 2. A magnetized part 60 formed by a thin wall of a portion of a circular cylinder is supported by an arm 61 mounted for rotation around an axis 62, which is also the geometrical axis of the cylinder of the magnetized part. Part 60 is magnetized perpendicularly to the direction of its movements, i.e., radially, a magnetic pole N appearing, for example, on its outer cylindrical surface, and a pole S on its inner cylindrical surface.

A stator structure 63 supported by a frame 75, as axis 62, comprises two stator parts 64,45 forming an air-gap 66. Each stator part has two polar parts, namely the parts 67 and 68 as far as stator part 64 is concerned, and parts 69,70 for a stator part 65, the polar surfaces of these parts being cylindrical and co-axial. The stator parts are formed by a stack of sheets in a way similar to that of the structure of FIGS. 1 and 2, and the polar parts are surrounded by respective electric coils 71,72,73,74, these coils being, for example, bent after winding and thus adapted to the polar parts.

The dimensioning and the operation of this device are similar to those of FIGS. 1 and 2, the force provided extending tangentially with respect to the parts of movement of the magnetized part. In a practical example, the maximum length of movement of the arm corresponded to a total angular movement of 26° and the torque per ampere-turn was $6.34 \cdot 10^{-4}$ Nm. For an electric peak power of 10 W, the total torque was thus 0.084 Nm. Such a device with rotatory arm is used, for example, for actuating the arm of a rotatable disc memory of a usual type.

Figure 7:
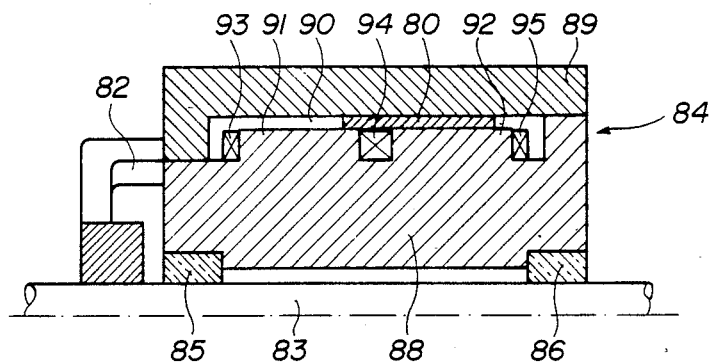
FIG. 7 is an axial section of a linear actuating device with a cylindrical magnet.
Figure 8:
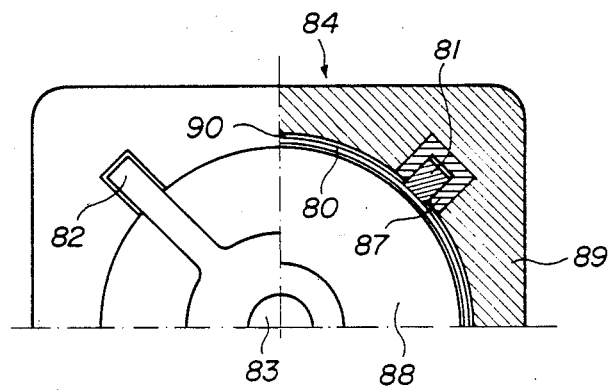
FIG. 8 is an axial view, partially in section, of the device of FIG. 7.

FIGS. 7 and 8 show another embodiment of an actuating device derived from that of FIGS. 1 and 2. This is a linear actuator with cylindrical magnet whereby since the magnetized part 80 is formed by a thin wall of a circular cylinder extending over 360°, the direction of magnetization being radial. This magnetized part is supported by arms parallel to its axis, such as arms 81,82, which arms are solid with an axial shaft 83.

The shaft 83 is, for example, arranged for gliding in a stator structure 84 by means of bearings 85,86 or ball bushings, for example. One of the supporting arms 81 can be guided in the stator structure by means of a guiding member 87 so as to prevent a rotation of the movable member. According to an alternative arrangement of this device, shaft 83 and the supporting device of the magnetized part are provided with a thread with wide pitch, so as to have the shaft 83 turn when the magnetized part effects a linear movement.

The stator structure 84 comprises two stator parts 88,89 forming a cylindrical air-gap 90 in which the magnetized part 80 is arranged. The lower stator part 88 has two cylindrical polar parts 91,92 which are surrounded by annular energizing coils 93,94,95. These coils can be wound, for example, by means of a continuous wire, coils 93 and 95 being, in that case, wound in the same direction, and coil 94 in the opposite direction, with a number of turns equal to or twice the one number of turns of each of the coils 93 and 95. The outer stator part 89 is not provided with coils and forms a simple yoke for closing the magnetic circuits as in the case of a dissymmetrical arrangement of the structure of FIGS. 1 and 2.

In a particularly economic embodiment, the stator structure is made by a process of sintering, while the magnetized part is, for example, made of moulded samarium-plastic. The dynamic response of such a system is strongly dampened by the eddy currents generated by the movement of the magnetized part.

Figure 9:
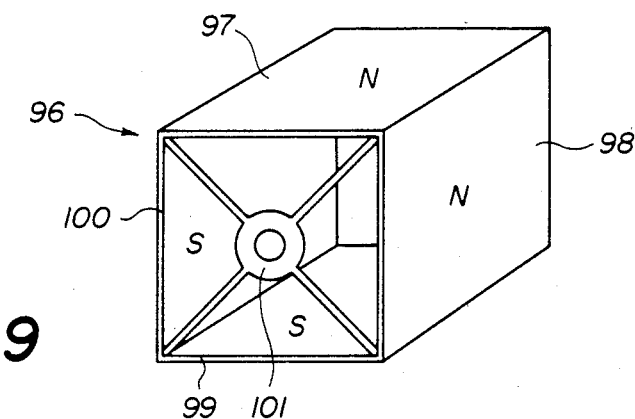
FIG. 9 is a schematic view in perspective of a rectangular assembly of magnetized parts which can be used in a device similar to that of FIG. 7.

FIG. 9 shows a movable member used in an alternative arrangement of the device of FIGS. 7 and 8, in which the air-gap is not cylindrical but rectangular. In this case, the movable member 96 comprises four flat magnetized parts 97,98,99,100 assembled so as to form a rectangular parallelepiped and supported by arms solid with a fixing member 101 on a sliding rod not shown. The stator structure can, in that case, be a mere variant of that of FIGS. 7 and 8, or it can be made in the form of a multiple structure composed of structures similar to that of FIGS. 1 and 2.

I claim:

1. An electromagnetic actuating device comprising:
   a movable member comprising at least one part magnetized perpendicularly to the direction of its movement, the thickness of the magnetized part measured in the direction of the magnetization being substantially constant over the length of the path of relative movement of a stationary point with respect to a point located closely on the magnetized part, and being small with respect to the length of the magnet measured along this same path of movement, the magnetized part being made of a material having in the whole working range a substantially linear demagnetization characteristic and a reversible permeability close to that of air; and
   a stator structure comprising at least one magnetic circuit made of a material of a very high magnetic permeability, and having an air-gap in which at least one portion of said magnetized part is arranged, the stator structure further comprising at least one electric energizing coil coupled with said magnetic cirucit,
   wherein the magnetized part has a single pair of magnetic poles, the magnetization being practically uniform and extending over a length $X_A$ measured along the path of movement of a point of the magnetized part located in the air-gap,
   wherein the stator structure comprises on at least one side of the air-gap two polar parts surrounded by respective energizing coils, said polar parts having each a length $X_P$ measured along the same path of movement as $X_A$, and being spaced by a distance $X_C$ also measured along that path of movement, $X_A$ being substantially greater than $X_C$ and notably smaller than $X_C + 2 X_P$,
   wherein the movable member is arranged to allow the magnetized part to effect a movement limited to a maximum length of movement of $X/2$ in both directions from a position of symmetry between said polar parts, X being measured as $X_P$ and being no greater than $X_P - 0.5$ E, wherein $X_P$ is greater than 8 E and E designates a constant dimension of the air-gap measured perpendicularly to said paths of movement at the place of a polar part, and
   wherein the stator structure is arranged so that the magnetic fluxes generated by the magnetized part in said structure are closed in said material of high magnetic permeability outside of said air-gap.

2. An electromagnetic actuating device comprising:
   a movable member comprising at least one part magnetized perpendicularly to the direction of its movement, the thickness of the magnetized part measured in the direction of the magnetization being substantially constant over the length of the path of relative movement of a stationary point with respect to a point located closely on the magnetized part, and being small with respect to the length of the magnet measured along this same path of movement, the magnetized part being made of a material having in the whole working range a substantially linear demagnetization characteristic and a reversible permeability close to that of air; and a stator structure comprising at least one magnetic circuit made of a material of a very high magnetic permeability, and having an air-gap in which at least a portion of said magnetized part is arranged, the stator structure further comprising at least one electric energizing coil coupled with said magnetic circuit, wherein the magnetized part has two pairs of magnetic poles arranged side by side in the direction of movement, the magnetization of each of said pairs being practically uniform and of a direction opposite to that of the other pair, and extending over a length $X_A$ measured along the path of movement of a point of the magnetized part located in the air-gap, wherein the stator structure comprises on at least one side of the air-gap a first polar part surrounded by an electric energizing coil, said polar part having a length $X_P$ measured along the same path of movement as $X_A$, as well as two polar parts not surrounded by coils, having a length equal to at least $X_P$ and arranged on either side of the first polar part with a respective spacing of $X_C$, measured also along said path of movement, $X_A$ being substantially greater than $X_P/2$, wherein the movable member is arranged for allowing the magnetized part to effect a movement limited to a maximum length of movement of $X/2$ in both directions from a position of symmetry with respect to said first polar part, X being measured as $X_P$ and being at most equal to $X_P - 0.5$ E, wherein $X_P$ is greater than 8 E and E designates a constant dimension of the air-gap measured perpendicularly to said path of movement at the place of a polar part, and wherein the stator structure is arranged so that the magnetic fluxes generated by the magnetized part in said structure are closed in said material of high magnetic permeability outside of said air-gap.

3. A device according to claim 1 or 2, wherein the length $X_A$ is practically equal to $X_P + X_C$.

4. A device according to claim 1 or 2, wherein the magnetic circuits have a lamellar structure.

5. A device according to claim 1 or 2, wherein the coils are placed in the immediate vicinity of the air-gap.

6. A device according to claim 1 or 2, wherein the magnetized part has the form of a thin wall portion of a circular cylinder, the movement of the movable member being an angular movement around the axis of said cylinder.

7. A device according to claim 1 or 2, wherein the magnetized part has the form of a thin wall of a circular cylinder, the movement of the movable member taking place in the direction of the generating lines of said cylinder.

8. A device according to claim 1 or 2, wherein the movable member comprises a plurality of magnetized parts, each part cooperating with a respective stator structure.

9. An electromagnetic actuating device comprising:

a movable member comprising at least one part magnetized perpendicularly to the direction of its movement and having a small thickness with respect to its other dimensions; and a stator structure comprising at least one magnetic circuit made from a material of very high magnetic permeability and having an air-gap in which at least one portion of said magnetized part is arranged, the stator structure further comprising at least one electric energizing coil coupled with said magnetic circuit, wherein said stator structure and said magnetized part are arranged so that the magnetized part can effect a limited movement in the air-gap under the action of a constant force proportional to the current flowing in the at least one energizing coil and so that the magnetic fluxes generated by the magnetized part in said stator structure are closed in said material of high magnetic permeability outside of said air-gap, whereby the magnetized part is subjected to a negligible residual torque in the absence of energizing current.

10. A device according to claim 1 or 2 wherein the magnetized part has the form of walls of a rectangular parallelepiped, the movement of the movable member taking place in the direction of the generating lines of these walls.

* * * * *